(12) United States Patent
Hong

(10) Patent No.: US 8,811,477 B2
(45) Date of Patent: *Aug. 19, 2014

(54) VIDEO PROCESSING METHOD AND APPARATUS BASED ON MULTIPLE TEXTURE IMAGES USING VIDEO EXCITATION SIGNALS

(75) Inventor: Sung-Hoon Hong, Daegu (KR)

(73) Assignee: Electronics and Telecommunications Research Institute, Daejeon (KR)

(*) Notice: Subject to any disclaimer, the term of this patent is extended or adjusted under 35 U.S.C. 154(b) by 393 days.

This patent is subject to a terminal disclaimer.

(21) Appl. No.: 13/222,504

(22) Filed: Aug. 31, 2011

(65) Prior Publication Data

US 2012/0051423 A1 Mar. 1, 2012

(30) Foreign Application Priority Data

Sep. 1, 2010 (KR) .................. 10-2010-0085612
Aug. 12, 2011 (KR) .................. 10-2011-0080664

(51) Int. Cl.
*H04B 1/66* (2006.01)
*H04N 7/50* (2006.01)
*G06K 9/46* (2006.01)
*H04N 7/26* (2006.01)

(52) U.S. Cl.
CPC .............. *H04N 7/50* (2013.01); *H04N 7/26643* (2013.01); *H04N 7/26638* (2013.01)
USPC .................................... 375/240.08; 382/190

(58) Field of Classification Search
CPC .................. H04N 19/00387; H04N 19/00745; H04N 7/50; H04N 7/26643; H04N 7/26638
USPC .......... 348/500, 571; 382/190, 181, 191, 276, 382/305; 375/240.01–240.28
See application file for complete search history.

(56) References Cited

U.S. PATENT DOCUMENTS

| 6,192,150 B1* | 2/2001 | Leow et al. ................... 382/190 |
| 2002/0051571 A1* | 5/2002 | Jackway et al. ............... 382/190 |
| 2004/0071363 A1* | 4/2004 | Kouri et al. ................... 382/276 |
| 2010/0183225 A1* | 7/2010 | Vantaram et al. ............. 382/173 |
| 2012/0177121 A1* | 7/2012 | Tripathi et al. .......... 375/240.16 |
| 2013/0003854 A1* | 1/2013 | Boon et al. ............... 375/240.16 |

* cited by examiner

*Primary Examiner* — Behrooz Senfi
(74) *Attorney, Agent, or Firm* — Staas & Halsey LLP

(57) ABSTRACT

Disclosed herein is a video processing apparatus and method based on multiple texture images using video excitation signals. For this, an input video is divided into shot segment, and one is selected from a plurality of frames of each shot segment as a seed image. A plurality of texture points are detected from the seed image. The plurality of texture points are tracked from the plurality of frames of the shot segment and then spatio-temporal location transform variables for the respective texture points are calculated. A plurality of texture images are defined using texture points at which the spatio-temporal location transform variables correspond to one another. Each of the plurality of texture images is defined as a sum of a plurality of texture blocks that are outputs of texture synthesis filters that receive video excitation signals as inputs.

14 Claims, 5 Drawing Sheets

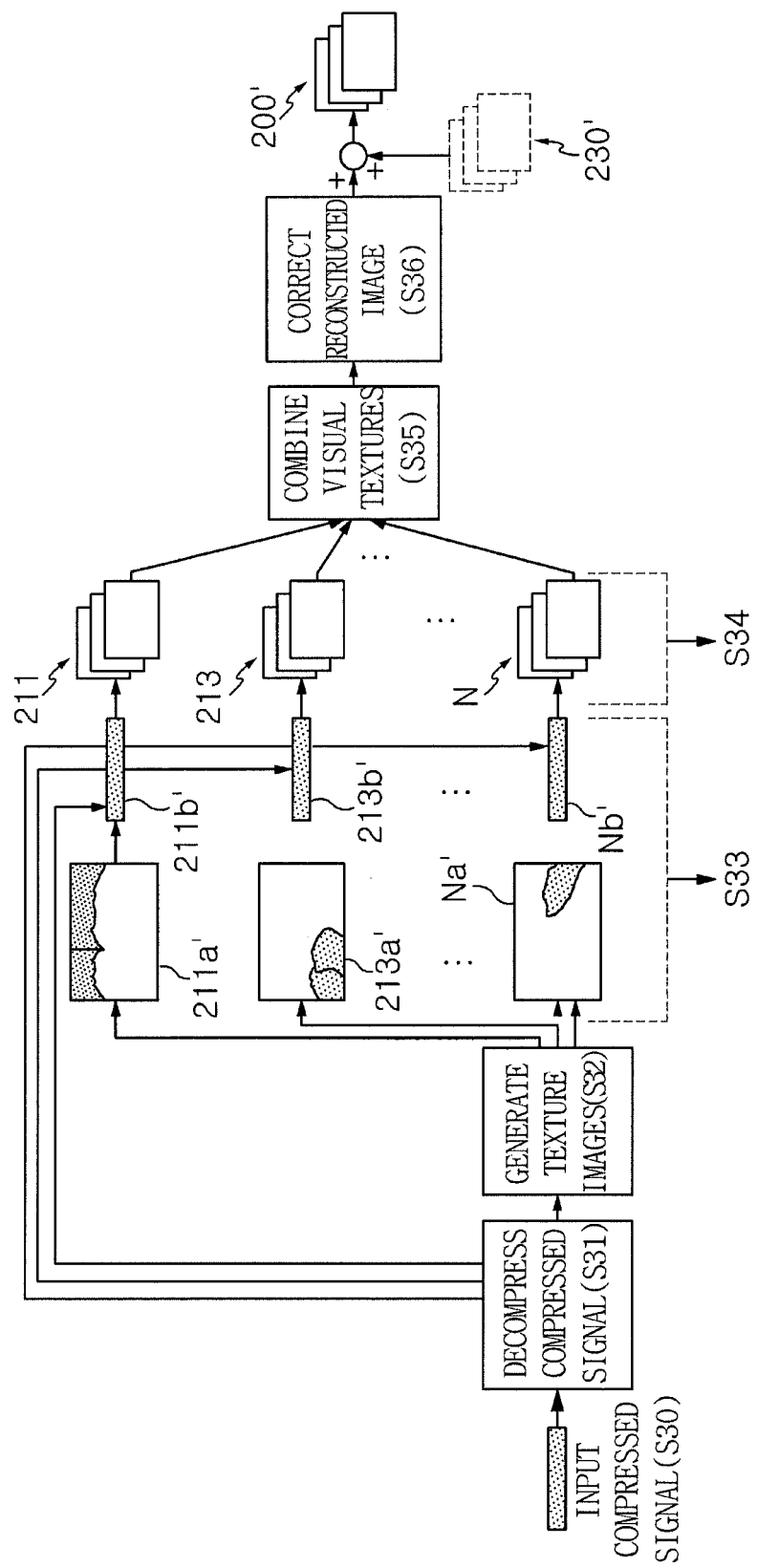

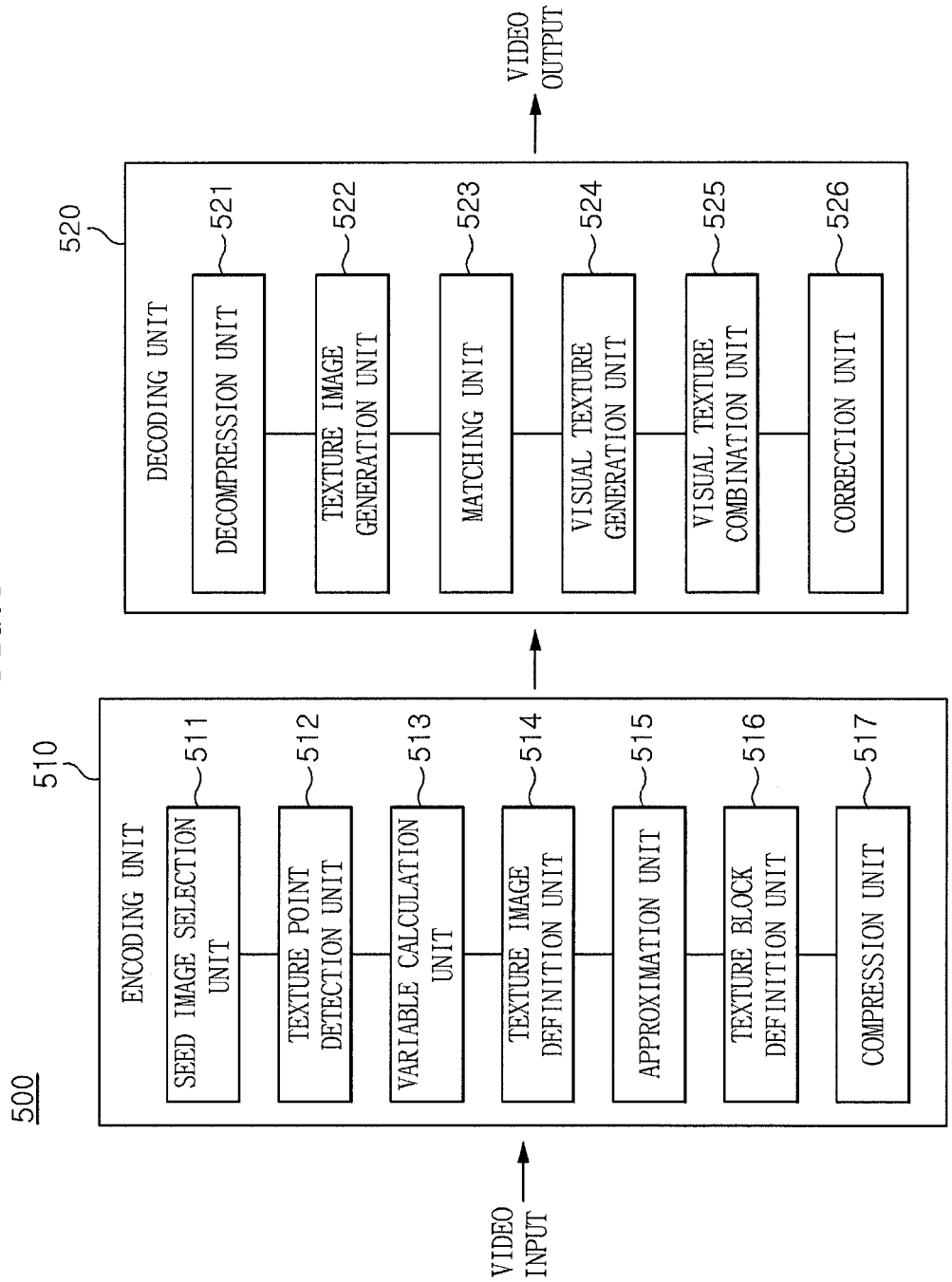

VIDEO PROCESSING METHOD AND APPARATUS BASED ON MULTIPLE TEXTURE IMAGES USING VIDEO EXCITATION SIGNALS

CROSS REFERENCE TO RELATED APPLICATIONS

This application claims the benefit of Korean Patent Application Nos. 10-2010-0085612 filed on Sep. 1, 2010, and 10-2011-0080664 filed on Aug. 12, 2011, which are hereby incorporated by reference in their entirety into this application.

BACKGROUND OF THE INVENTION

1. Technical Field

The present invention relates generally to a video processing method and apparatus based on multiple texture images using video excitation signals. More particularly, the present invention relates to a video processing apparatus and method based on multiple texture images using video excitation signals, which can process videos with optimal video quality at a low transfer rate.

2. Description of the Related Art

A typical video processing method is based on a method of performing transform region-based processing on signals, which have been motion-estimated and processed between video frames, using a discrete cosine transform or the like. However, such a typical video processing method is problematic in that it is difficult to represent the characteristics of various actual videos due to the incorrect estimation and modeling of the characteristics of videos. Further, due thereto, a problem arises in that the differences between a transformed video signal and the original video signal increase, thus increasing a bit rate when the relevant video signal is compressed. In order to solve this problem, although video compression standards represented by MPEG 1/2/4 and H.261/263/264 have been proposed, the deterioration of video quality still becomes serious upon video compression at a low transfer rate, such as 1/500 bit rate relative to the original video size, at the present time. Further, a 1/n pixel-based motion estimation and compensation method, an adaptive block size transform region-based video processing method, a multi-reference frame motion estimation and compensation method, and a generalized B-frame processing method have been proposed and used. However, there still remains a disadvantage in that the deterioration of video quality is serious upon video compression at the low transfer rate.

SUMMARY OF THE INVENTION

Accordingly, the present invention has been made keeping in mind the above problems occurring in the prior art, and an object of the present invention is to represent various video characteristics using a plurality of texture images and the spatio-temporal location transform variables of the texture images.

Another object of the present invention is to remarkably reduce the size of a compressed video compared to the size of the original video by compressing and processing the original video only using a plurality of texture images and a plurality of spatio-temporal location transform variables corresponding thereto.

A further object of the present invention is to provide a compressed video, the size of which is remarkably reduced compared to the original video, by defining each of a plurality of texture images as the sum of texture blocks that are outputs of texture synthesis filters which receive video excitation signals, each represented by a Gaussian function, as inputs.

Yet another object of the present invention is to reduce the size of a compressed video by approximating a number of predetermined texture images using similarities between spatio-temporal location transform variables.

Still another object of the present invention is to process videos with optimal video quality at a low transfer rate.

In accordance with an aspect of the present invention to accomplish the above objects, there is provided a video processing method based on multiple texture images, including dividing an input video into shot segments, and selecting one from a plurality of frames of each shot segment as a seed image; detecting a plurality of texture points from the seed image; tracking the plurality of texture points from the plurality of frames of the shot segment and then calculating spatio-temporal location transform variables for the respective texture points; defining a plurality of texture images using texture points at which the spatio-temporal location transform variables correspond to one another; and defining each of the plurality of texture images as a sum of a plurality of texture blocks that are outputs of texture synthesis filters that respectively receive video excitation signals as inputs.

Preferably, each of the video excitation signals is represented by a two-dimensional (2D) Gaussian function.

Preferably the video processing method may further include compressing the video excitation signals of the plurality of texture blocks that defines each of the plurality of texture images, variables of the texture synthesis filters for the texture blocks, and spatio-temporal location transform variables respectively corresponding to the texture images.

Preferably, the compressing my be configured to compress the video excitation signals, the variables of the texture synthesis filters, and the spatio-temporal location transform variables in a bit stream compression manner.

Preferably, the video processing method may further include merging texture images, which have spatio-temporal location transform variables for which similarities calculated by obtaining correlation characteristics between texture image signals have values falling within a preset threshold value, among the plurality of texture images, into a single texture image, thus approximating the texture images.

Preferably, the detecting the plurality of texture points may be configured to detect, as the texture points, points having variations equal to or greater than a preset value in the plurality of frames.

Preferably, the video processing method may further include decompressing the compressed video excitation signals, the compressed variables of the texture synthesis filters, and the compressed spatio-temporal location transform variables respectively corresponding to the compressed texture images; generating the plurality of texture blocks using both the video excitation signals and the variables of the texture synthesis filters, and generating each texture image by adding the plurality of texture blocks; matching the texture images with the spatio-temporal location transform variables corresponding to the texture images; generating visual textures using the texture images and the spatio-temporal location transform variables; and combining the generated visual textures corresponding to the respective texture images.

Preferably, the video processing method may further include correcting artifacts occurring at boundaries of combination of the visual textures by filtering the artifacts.

In accordance with an aspect of the present invention to accomplish the above objects, there is provided a video processing apparatus based on multiple texture images, including a seed image selection unit for dividing an input video into shot segments, and selecting one from a plurality of frames of each shot segment as a seed image; a texture point detection unit for detecting a plurality of texture points from the seed image; a variable calculation unit for tracking the plurality of texture points from the plurality of frames of the shot segment and then calculating spatio-temporal location transform variables for the respective texture points; a texture image definition unit for defining a plurality of texture images using texture points at which the spatio-temporal location transform variables correspond to one another; and a texture block definition unit for defining each of the plurality of texture images as a sum of a plurality of texture blocks that are outputs of texture synthesis filters that respectively receive video excitation signals as inputs.

Preferably, each of the video excitation signals may be represented by a two-dimensional (2D) Gaussian function.

Preferably, the video processing apparatus may further include a compression unit for compressing the video excitation signals of the plurality of texture blocks that defines each of the plurality of texture images, variables of the texture synthesis filters for the texture blocks, and spatio-temporal location transform variables respectively corresponding to the texture images.

Preferably, the compression unit may compress the video excitation signals, the variables of the texture synthesis filters, and the spatio-temporal location transform variables in a bit stream compression manner.

Preferably, the video processing apparatus may further include an approximation unit for merging texture images, which have spatio-temporal location transform variables for which similarities calculated by obtaining correlation characteristics between texture image signals have values falling within a preset threshold value, among the plurality of texture images, into a single texture image, thus approximating the texture images.

Preferably, the texture point detection unit may detect, as the texture points, points having variations equal to or greater than a preset value in the plurality of frames.

Preferably, the video processing apparatus may further include a decompression unit for decompressing the compressed video excitation signals, the compressed variables of the texture synthesis filters, and the compressed spatio-temporal location transform variables respectively corresponding to the compressed texture images; a texture image generation unit for generating the plurality of texture blocks using both the video excitation signals and the variables of the texture synthesis filters, and generating each texture image by adding the plurality of texture blocks; a matching unit for matching the texture images with the spatio-temporal location transform variables corresponding to the texture images; a visual texture generation unit for generating visual textures using the texture images and the spatio-temporal location transform variables; and a visual texture combination unit for combining the generated visual textures corresponding to the respective texture images.

Preferably, the video processing apparatus may further include a correction unit for correcting artifacts occurring at boundaries of combination of the visual textures by filtering the artifacts.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing the decoding method of the video processing method based on multiple texture images according to the present invention; and FIG. 5 is a block diagram showing a video processing apparatus based on multiple texture images according to the present invention.

DESCRIPTION OF THE PREFERRED EMBODIMENTS

Figure 1:
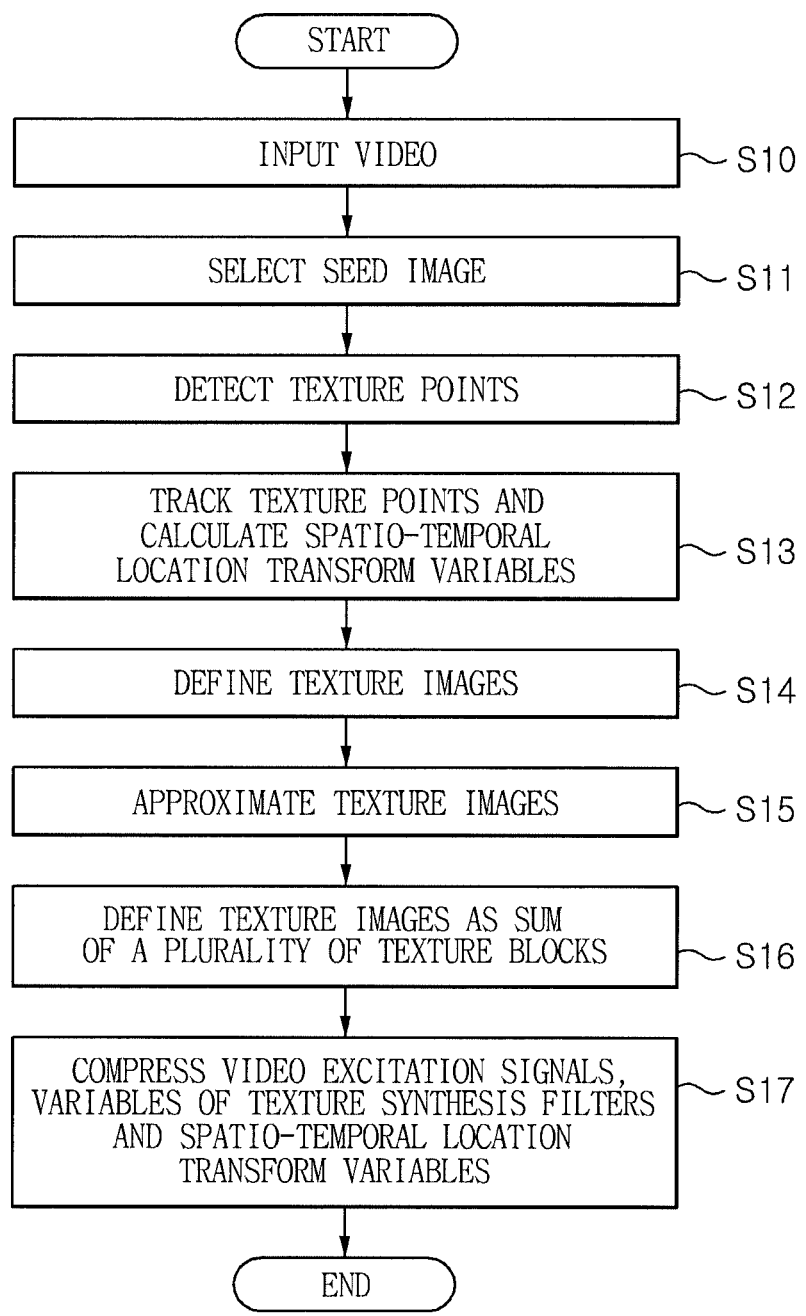
FIG. 1 is an operating flowchart showing the encoding method of a video processing method based on multiple texture images according to the present invention.

The present invention will be described in detail below with reference to the attached drawings. If in the specification, detailed descriptions of well-known functions or configurations may unnecessarily make the gist of the present invention obscure, the detailed descriptions will be omitted. The embodiments of the present invention are provided to describe the present invention more completely to those skilled in the art. Therefore, the shapes or sizes of components in the drawings may be exaggerated for the sake of providing a more definite description.

Hereinafter, the encoding method of a video processing method based on multiple texture images according to the present invention will be described.

Figure 2:
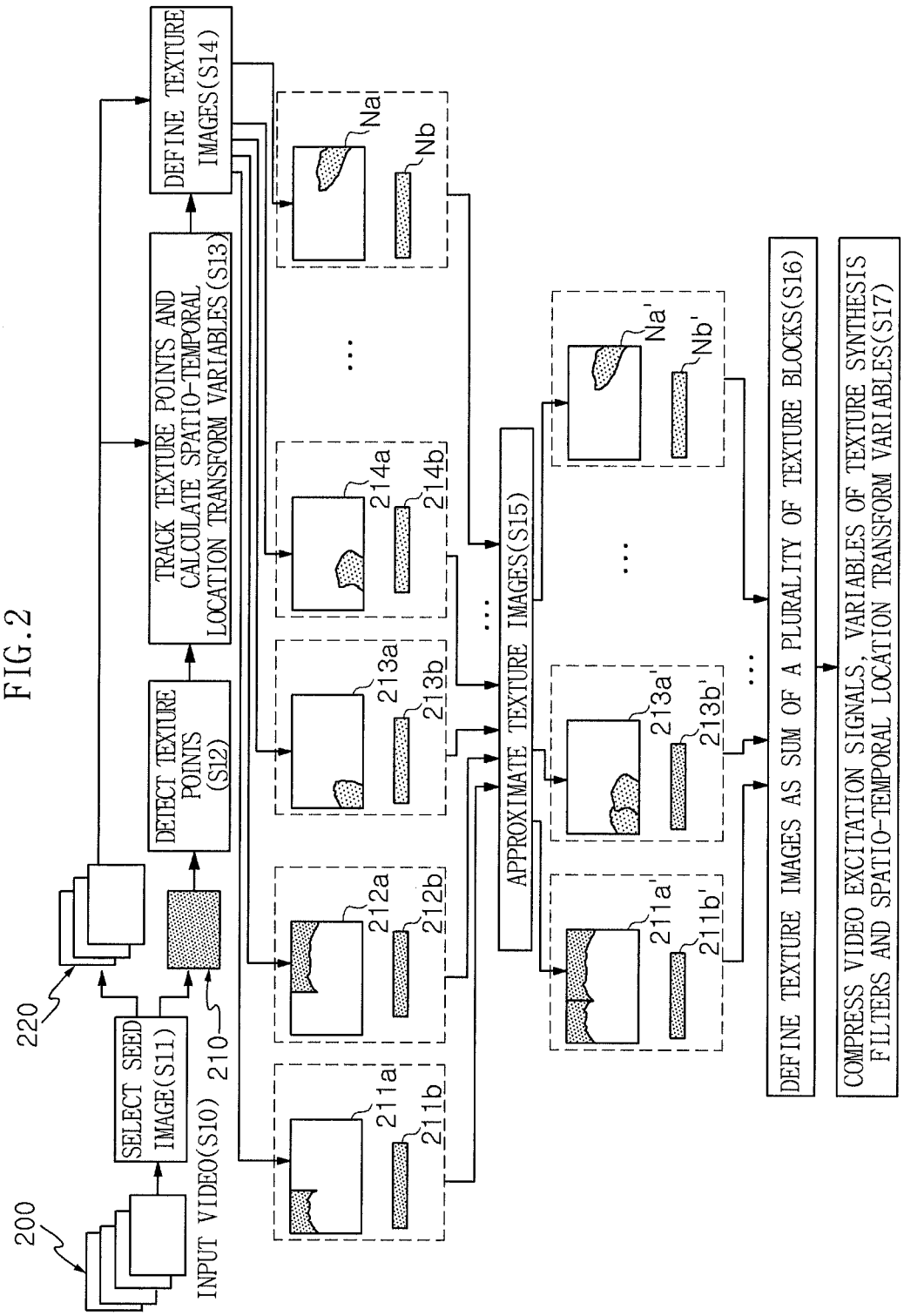
FIG. 2 is a diagram showing the encoding method of the video processing method based on multiple texture images according to the present invention.

FIG. 1 is an operating flowchart showing the encoding method of a video processing method based on multiple texture images according to the present invention. FIG. 2 is a diagram showing the encoding method of the video processing method based on multiple texture images according to the present invention.

Referring to FIGS. 1 and 2, in the encoding method of the video processing method based on multiple texture images according to the present invention, an input video 200 composed of a plurality of frames is input at step S10.

Further, the input video 200 is divided into shot segments, and one of a plurality of frames of each shot segment is selected as a seed image 210 at step S11. The remaining frames rather than the seed image 210 of the shot segment are defined as residual frame images 220. That is, when the shot segment is composed of k frames, one seed image is selected and the remaining k−1 frames are defined as the residual frame images 220. In this case, the shot segment corresponds to images continuously captured by a single camera.

A plurality of texture points are detected from the seed image 210, selected at step S11, at step S12. In this case, in the plurality of frames of each shot segment, points having variations equal to or greater than a preset value can be detected as texture points. That is, when specific points in the seed image 210 and the residual frame images 220 exhibit variations equal to or greater than the preset value, the specific points can be detected as the texture points.

Further, the plurality of texture points are tracked from the plurality of frames of the shot segment and spatio-temporal location transform variables for the respective texture points are calculated at step S13. That is, the spatio-temporal location transform variables that define variations in the texture points in the seed image 210 and the residual frame images 220 are calculated. Each of the spatio-temporal location transform variables may have the form of a function indicating a variation or the like in the position of a relevant texture point over time.

A plurality of texture images 211a, 212a, 213a, 214a, and Na are defined using texture points at which the spatio-temporal location transform variables 211b, 212b, 213b, 214b, and Nb calculated at step S13 mutually correspond to one another at step S14. In this case, a single texture image can be defined by associating texture points at which the spatio-temporal location transform variables 211b, 212b, 213b, 214b, and Nb are mutually identical to one another.

Further, in the plurality of texture images, texture images having similar spatio-temporal location transform variables are merged into a single texture image and are then approximated at step S15. In this case, similarities between the spatio-temporal location transform variables can be calculated by obtaining correlations between the texture image signals. Further, texture images for which similarities between spatio-temporal location transform variables have values falling within a preset threshold value may be merged into a single texture image. In FIG. 2, the first texture image 211a and the second texture image 212a, for which the spatio-temporal location transform variables are assumed to have higher similarity, are merged with each other, and in accordance with this merging, the first spatio-temporal location transform variable 211b and the second spatio-temporal location transform variable 212b are merged with each other. Accordingly, a first approximate texture image 211a' and a first approximate spatio-temporal location transform variable 211b' are generated. Further, the third texture image 213a and the fourth texture image 214a are merged with each other, and in accordance with this merging, the third spatio-temporal location transform variable 213b and the fourth spatio-temporal location transform variable 214b are merged with each other. Accordingly, a second approximate texture image 213a' and a second approximate spatio-temporal location transform variable 213b' are generated.

Further, each of the plurality of texture images 211a, 212a, 213a, 214a, and Na is defined as the sum of a plurality of texture blocks at step S16. If step S15 has been performed, each of the plurality of approximate texture images 211', 213', and Na' may be defined as the sum of a plurality of texture blocks. In this case, each texture block may be defined as the output of a texture synthesis filter that receives a video excitation signal as an input. Further, the video excitation signal may be represented by a two-dimensional (2D) Gaussian function. The video excitation signal, that is, the Gaussian function, has a size variable 'G', a mean variable 'm' and a variance 'a' as model variables. Furthermore, such a texture synthesis filter has a transform region filter coefficient given in the following Equation 1 as a model variable:

$$h = \begin{bmatrix} h_{1,1} & h_{1,2} & \cdots & h_{1,M} \\ h_{2,1} & h_{2,2} & \cdots & h_{2,M} \\ \vdots & \vdots & \vdots & \vdots \\ h_{M,1} & h_{M,2} & \cdots & h_{M,M} \end{bmatrix} \quad (1)$$

Values for the variables of the video excitation signal, that is, values G, m and a, and values for variables h of the texture synthesis filter are obtained to minimize a difference between an estimated texture value and an original texture signal value in a transform region. An estimated texture signal R in the transform region is represented by the following Equation 2:

$$R = E \cdot H \quad (2)$$

E and H denote an excitation signal vector and a texture synthesis filter coefficient vector, respectively, in the transform region, and '·' denotes the product of individual components of the vectors. The excitation signal vector E is approximated to a 2D Gaussian function, and the texture synthesis filter H has the characteristics that most variables have values of '0' and that variable values appear only in some regions, depending on the characteristics of a texture transform region. Therefore, the video processing method of the present invention can perform compression at very low bit rate using a variable length encoder or an arithmetic encoder.

Furthermore, the respective video excitation signals of a plurality of texture blocks that define each of the plurality of texture images 211a, 212a, 213a, 214a, and Na, the variables of the respective texture synthesis filters for the texture blocks, and the plurality of spatio-temporal location transform variables 211b, 212b, 213b, 214b and Nb respectively corresponding to the plurality of texture images 211a, 212a, 213a, 214a, and Na are compressed at step S17. Further, at step S17, on the assumption that the step S15 of approximating the texture images has been performed, the respective video excitation signals of the plurality of texture blocks that define each of the plurality of approximate texture images 211a', 213a', and Na', the variables of the respective texture synthesis filters for the texture blocks, and the plurality of approximate spatio-temporal location transform variables 211b', 213b' and Nb' respectively corresponding to the plurality of approximate texture images may be compressed. Here, compression may be performed in a bit stream compression manner.

Hereinafter, the encoding method of the video processing method based on multiple texture images according to the present invention will be described with reference to the following equations.

The texture points can be detected as follows. First, for an input video $\{I(x,y,k)\}_{x=1, 2, \ldots, w, y=1, 2, \ldots, h}$ composed of k frames, an autocorrelation matrix $E\{\vec{I}^{(j)}\vec{I}^{(j)t}\}$ is calculated, where $\vec{I}^{(j)}$ denotes the surrounding window signal of a point when $\{x, y\}$ satisfies $\{I(x^{(j)}, y^{(j)}, k)\}_{x^{(j)}-w' \leq x \leq x^{(j)}+w', y^{(j)}-h' \leq y \leq y^{(j)}+h'}$. Further, x and y denote pixel points in an x axis direction and a y axis direction, respectively, and $E\{\bullet\}$ is defined by a statistical expectation operator.

From eigenvalues calculated at the pixel point $\{x, y\}$ by $E\{\vec{I}^{(x,y)}\vec{I}^{(x,y)t}\}$, that is, $\lambda_1^{(x,y)}$ and $\lambda_2^{(x,y)}$, a texture point matrix $\{p(x,y,k)\}_{x=1, 2, \ldots, w, y=1, 2, \ldots, h}$ can be obtained by the following Equation 3:

$$p(x, y, k) = 1 \quad \text{if } \lambda_1^{(j)} > \theta_1 \text{ and } \lambda_2^{(j)} > \theta_2 \quad (3)$$
$$0 \quad \text{elsewhere}$$

where $\theta_1$ and $\theta_2$ correspond to preset threshold values. In Equation 3, when the $\lambda_1^{(x,y)}$ and $\lambda_2^{(x,y)}$ at the specific pixel position are greater than $\theta_1$ and $\theta_2$, respectively, the relevant specific pixel is defined as 1. Further, when $\lambda_1^{(x,y)}$ and $\lambda_2^{(x,y)}$ at the specific pixel position are less than $\theta_1$ and $\theta_2$, respectively, the relevant specific pixel is defined as 0, and then the texture point matrix is obtained.

Further, the plurality of spatio-temporal location transform variables that define respective texture images, and the related texture images can be defined by the following Equation 4:

$$I^{(i)}(x,y,k) = w^{(i)}(x,y)I(x,y,k) \quad (4)$$

where $w^{(i)}(x,y)$ can be defined by the following Equation 5:

$$w^{(i)}(x, y) = 1 \quad \text{if } x^{(i)} - \frac{w'}{2} \leq x \leq x^{(i)} + \frac{w'}{2} \text{ and } p(x, y, k) = 1 \quad (5)$$
$$\quad 0 \quad \text{elsewhere}$$

Further, the input video $\{I(x,y,k)\}_{x=1, 2, \ldots, w, y=1, 2, \ldots h}$ composed of k frames can be defined by the sum of N texture images, as given by the following Equation 6:

$$I(x, y, k) = \sum_{i=1}^{N} I^{(i)}(x, y, k) \quad (6)$$

Furthermore, the ith segmented texture image in Equation 6 can be approximated and represented by the following Equation 7:

$$I^{(i)}(x,y,k) = T^{(i)}(I^{(i)}(x-dx_i, y-dy_i, l)) + e^{(i)}(x,y,k) \quad (7)$$

where $T^{(i)}(\bullet)$ denotes a transform function, $I^{(i)}(x,y,l)$ denotes the ith segmented texture image of the lth frame of the input video, $\{dx_i, dy_i\}$ denotes position transform vectors in x and y axis directions, and $e^{(i)}(x,y,k)$ denotes an approximate error signal estimated from $I^{(i)}(x,y,k)$. Further, in Equation 7, a frame number k falls within a range from l+1 to l+M. Equation 7 can be approximated using Taylor expansion, as given by the following Equation 8:

$$I^{(i)}(x, y, k) = T^{(i)}\left(I^{(i)}(x, y, l) - [gx_i, gy_i]\begin{bmatrix} dx_i \\ dy_i \end{bmatrix}\right) + e^{(i)}(x, y, k) \quad (8)$$

where $gx_i$ and $gy_i$ respectively denote the sums of gradient values of $I^{(i)}(x,y,k)$ in the x and y axis directions. Further, the theorem of the sum of squares of the estimated error signal can be represented by the following Equation 9:

$$\varepsilon = \sum_{x=1}^{w}\sum_{y=1}^{h} e(x, y, k)^2 \quad (9)$$
$$= \sum_{i=1}^{N} e^{(i)}(x, y, k)^2$$
$$= \sum_{i=1}^{N}\sum_{x=1}^{w}\sum_{y=1}^{h}$$
$$\left[I^{(i)}(x, y, k) - T^{(i)}\left(I^{(i)}(x, y, l) - [gx_i, gy_i]\begin{bmatrix} dx_i \\ dy_i \end{bmatrix}\right)\right]^2$$

In this case, the value of $\{dx_i, dy_i, T^{(i)}(\bullet)\}$ can be obtained by assuming the minimization of the magnitude of $\epsilon$ which is the sum of squares of the estimated error signal. That is, the value of $\{dx_i, dy_i, T^{(i)}(\bullet)\}$ is obtained by calculating the following Equations 10 and 11:

$$\left.\frac{\partial \varepsilon}{\partial \vec{d}}\right|_{T^{(i)}(\cdot)} = 0 \quad (10)$$

$$\left.\frac{\partial \varepsilon}{\partial T^{(i)}}\right|_{\vec{d}} = 0 \quad (11)$$

In this case, when $T^{(i)}(\bullet)$ is assumed to be an identity transform formular, the following Equation 12 can be obtained using the above Equations 9 and 10, $$\left.\frac{\partial \varepsilon}{\partial \vec{d}}\right|_{T^{(i)}(\cdot)} = \sum_{i=1}^{N}\sum_{x=1}^{w}\sum_{y=1}^{h}\left[I^{(i)}(x, y, k) - \right. \quad (12)$$
$$\left. \left(I^{(i)}(x, y, l) - [gx_i, gy_i]\begin{bmatrix} dx_i \\ dy_i \end{bmatrix}\right)\right]\begin{bmatrix} gx_i \\ gy_i \end{bmatrix} = 0$$

Further, when Equation 12 is solved, the following Equation 13 for $\{dx_i, dy_i\}$ can be obtained.

$$\begin{bmatrix} dx_i \\ dy_i \end{bmatrix} = \frac{\sum_{x=1}^{w}\sum_{y=1}^{h}[I^{(i)}(x, y, k) - I^{(i)}(x, y, l)]\begin{bmatrix} gx_i \\ gy_i \end{bmatrix}}{\sum_{x=1}^{w}\sum_{y=1}^{h}\begin{bmatrix} gx_i \\ gy_i \end{bmatrix}[gx_i \quad gy_i]} \quad (13)$$

Furthermore, the transform function $T^{(i)}(\bullet)$ as given by the following Equation 14 can be obtained using $\{dx_i, dy_i\}$ obtained in Equation 13 and the above Equation 11, $$T^{(i)} = \sum_{i=1}^{N}\sum_{x=1}^{w}\sum_{y=1}^{h}\left[I^{(i)}(x, y, k) - T^{(i)}\left(I^{(i)}(x, y, l) - [gx_i, gy_i]\begin{bmatrix} dx_i \\ dy_i \end{bmatrix}\right)\right] \quad (14)$$
$$\left(I^{(i)}(x, y, l) - [gx_i, gy_i]\begin{bmatrix} dx_i \\ dy_i \end{bmatrix}\right)$$

Equations 10 and 11 are rearranged, and then $\{I^{(i)}(x,y,l+1)\}_{x=1, 2, \ldots, w, y=1, 2, \ldots h}$ can be obtained from the transform function $\{T_{l,l+1}^{(i)}\}_{i=1, 2, \ldots, N}$ of $\{I^{(i)}(x,y,l)\}_{x=1, 2, \ldots, w, y=1, 2, \ldots h}$. Further, $\{I^{(i)}(x,y,l+M)\}_{x=1, 2, \ldots, w, y=1, 2, \ldots h}$ can be obtained from the transform function $\{T_{l,l+M}^{(i)}\}_{i=1, 2, \ldots, N}$ of $\{I^{(i)}(x,y,l)\}_{x=1, 2, \ldots, w, y=1, 2, \ldots h}$. Furthermore, $\{I(x,y,k)\}_{x=1, 2, \ldots, w, y=1, 2, \ldots h, k=l, l+1, \ldots, l+M}$ can be represented by the seed image $\{I^{(i)}(x,y,l)\}_{x=1, 2, \ldots, w, y=1, 2, \ldots h}$ and the transform function $\{T_{l,l+j}^{(i)}\}_{i=1, 2, \ldots, N, j=1, 2, \ldots, M}$ by using Equations 3 to 14. Furthermore, the approximation of the texture image can be achieved by calculating the similarity between $\{T_{l,l+j}^{(i)}\}_{i=1, 2, \ldots, N, j=1, 2, \ldots, M}$.

Hereinafter, the decoding method of the video processing method based on multiple texture images according to the present invention will be described.

Figure 3:
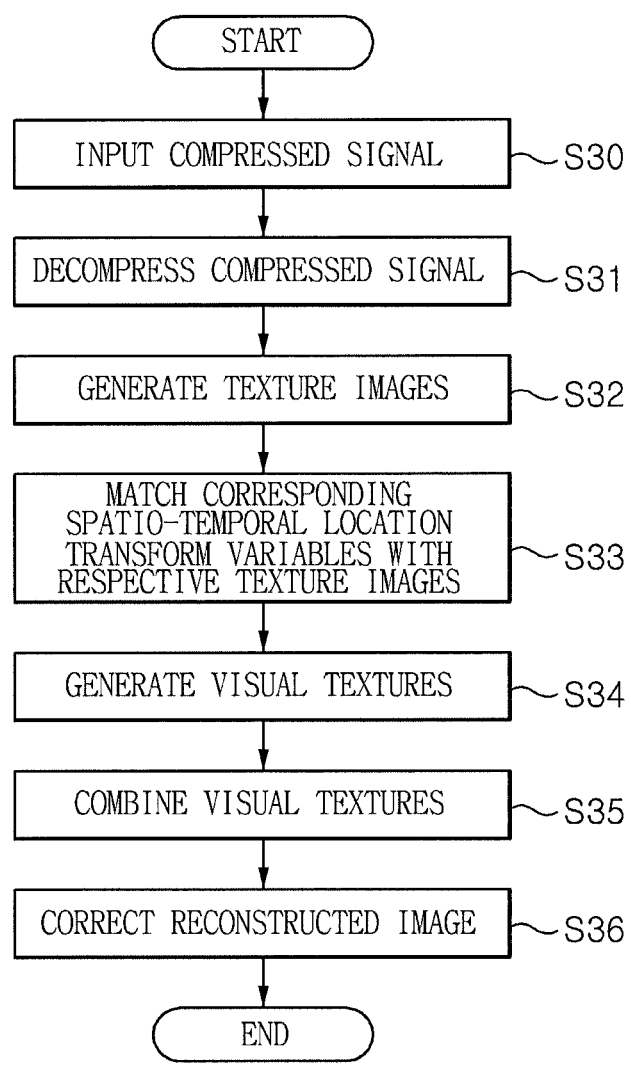
FIG. 3 is an operating flowchart showing the decoding method of the video processing method based on multiple texture images according to the present invention.

FIG. 3 is an operating flowchart showing the decoding method of the video processing method based on multiple texture images according to the present invention. FIG. 4 is a diagram showing the decoding method of the video processing method based on multiple texture images according to the present invention.

Referring to FIGS. 3 and 4, in the decoding method of the video processing method based on multiple texture images according to the present invention, a compressed video signal is input at step S30. In this case, the compressed video signal may be a signal in which respective video excitation signals of a plurality of texture blocks that define each of a plurality of texture images, the variables of texture synthesis filters for the texture blocks, and a plurality of spatio-temporal location transform variables corresponding to the respective texture images are compressed. Of course, the compressed video signal may also be a signal in which respective video excitation signals of a plurality of texture blocks that define each of a plurality of approximate texture images, the variables of texture synthesis filters for the texture blocks, and a plurality of approximate spatio-temporal location transform variables are compressed. Further, in the compressed video signal, the video excitation signals, the variables of the texture synthesis filters, and the plurality of spatio-temporal location transform variables may be compressed in a bit stream compression manner.

The compressed video signal is decompressed at step S31. That is, the compressed video excitation signals, the compressed variables of the texture synthesis filters, and the plurality of compressed spatio-temporal location transform variables corresponding to the respective texture images are decompressed.

Furthermore, a plurality of texture blocks are generated using the decompressed video excitation signals and the decompressed variables of the texture synthesis filters, and each texture image is generated by adding the plurality of texture blocks at step S32. The texture image at that time may be a texture image approximated during an encoding procedure.

In a plurality of generated texture images and the plurality of decompressed spatio-temporal location transform variables, each texture image and a spatio-temporal location transform variable corresponding to the texture image match each other in a one-to-one correspondence at step S33. Of course, each approximate texture image and an approximate spatio-temporal location transform variable corresponding to the approximate texture image may match each other. In FIG. 4, a first approximate texture image 211a' matches a first approximate spatio-temporal location transform variable 211b', and a second approximate texture image 213a' matches a second approximate spatio-temporal location transform variable 213b'. An Nth approximate texture image Na' matches an Nth approximate spatio-temporal location transform variable Nb'.

At step S34, visual textures are generated using the texture images and the spatio-temporal location transform variables that have matched at step S33. In detail, the spatio-temporal location transform variables defining the motions of the texture points over time are applied to the texture images, and thus visual textures, each composed of a plurality of frames, for respective texture images are generated. Of course, the visual textures can also be generated using the approximate texture images and the approximate spatio-temporal location transform variables that have matched. In FIG. 4, a first visual texture 211 composed of a plurality of frames is generated using the first approximate texture image 211a' and the first approximate spatio-temporal location transform variable 211b'. Further, a second visual texture 213 composed of a plurality of frames is generated using the second approximate texture image 213a' and the second approximate spatio-temporal location transform variable 213b'. Furthermore, an Nth visual texture N composed of a plurality of frames is generated using the Nth approximate texture image Na' and the Nth approximate spatio-temporal location transform variable Nb'.

The visual textures generated to correspond to the respective texture images at step S34 are combined at step S35. The visual textures are combined, and thus a plurality of frames of a shot segment are entirely reconstructed. In FIG. 4, the first visual texture 211, the second visual texture 213, and the Nth visual texture N are combined.

Artifacts occurring at the combination boundary of the plurality of visual textures combined at step S35 are corrected via the filtering of the artifacts at step S36. That is, the plurality of visual textures combined at step S35 are reconstructed as the simple sum thereof, so that artifacts may occur at the boundaries between the visual textures. The filtering operation for eliminating these artifacts is performed, and thus the final corrected, reconstructed image is generated.

Other shot segment-reconstructed images are combined with the shot segment-reconstructed image obtained at step S36, and then a final video 200' can be generated.

Hereinafter, the construction and operation of the video processing apparatus based on multiple texture images according to the present invention will be described.

FIG. 5 is a block diagram showing the construction of a video processing apparatus based on multiple texture images according to the present invention.

Referring to FIG. 5, a video processing apparatus 500 based on multiple texture images according to the present invention may be configured to include an encoding unit 510 and a decoding unit 520.

The encoding unit 510 includes a seed image selection unit 511, a texture point detection unit 512, a variable calculation unit 513, a texture image definition unit 514, and a texture block definition unit 516. The encoding unit 510 may further include an approximation unit 515 and a compression unit 517.

The seed image selection unit 511 divides an input video into shot segments, and selects one from a plurality of frames of each shot segment as a seed image. Further, the seed image selection unit 511 defines the remaining frames rather than the seed image of the shot segment as residual frame images. That is, when the shot segment is composed of k frames, the seed image selection unit 511 selects one seed image, and defines the remaining k−1 frames as the residual frame images 220. In this case, the shot segment corresponds to images continuously captured by a single camera.

The texture point detection unit 512 detects a plurality of texture points from the seed image selected by the seed image selection unit 511. In this case, the texture point detection unit 512 may detect points, having variations equal to or greater than a preset value, as the texture points, from the plurality of frames of the shot segment. That is, when specific points in the seed image and in the residual frame images exhibit variations equal to or greater than the preset value, the texture point detection unit 512 may detect the relevant specific points as the texture points.

The variable calculation unit 513 tracks a plurality of texture points from the plurality of frames of the shot segment, and then calculates spatio-temporal location transform variables for the respective texture points. That is, the variable calculation unit 513 calculates the spatio-temporal location transform variables, which define variations in texture points in the seed image and the residual frame images. Each of the spatio-temporal location transform variables may have the form of a function indicating a variation or the like in the position of a relevant texture point over time.

The texture image definition unit 514 defines a plurality of texture images using texture points at which the spatio-temporal location transform variables calculated by the variable calculation unit 513 mutually correspond to one another. In this case, the texture image definition unit 514 may define a single texture image by associating texture points at which the spatio-temporal location transform variables are mutually identical to one another.

The approximation unit 515 approximates the texture images by merging texture images, having similar spatio-temporal location transform variables, among the plurality of texture images, into a single texture image. That is, the approximation unit 515 may generate a plurality of approximate texture images and a plurality of approximate spatio-temporal location transform variables in which the plurality of texture images and the plurality of spatio-temporal location transform variables are respectively approximated. In this case, the approximation unit 515 may calculate similarities between the spatio-temporal location transform variables by obtaining correlation characteristics between the texture image signals. Further, the approximation unit 515 may merge texture images for which the similarities between the spatio-temporal location transform variables have values falling within a preset threshold value into a single texture image.

The texture block definition unit 516 defines each of the plurality of texture images as the sum of a plurality of texture blocks. In this case, each texture block may be defined as the output of a texture synthesis filter that receives a video excitation signal as an input. Further, the video excitation signal may be represented by a 2D Gaussian function. Of course, the texture block definition unit 516 may define each of a plurality of approximate texture images as the sum of a plurality of texture blocks.

The compression unit 517 compresses the video excitation signals of the plurality of texture images, the variables of the texture synthesis filters for the texture images, and the plurality of spatio-temporal location transform variables respectively corresponding to the texture images. Of course, the compression unit 517 may compress the video excitation signals of the plurality of approximate texture images, the variables of the texture synthesis filters for the approximate texture images, and the plurality of approximate spatio-temporal location transform variables.

The decoding unit 520 includes a decompression unit 521, a texture image generation unit 522, a matching unit 523, a visual texture generation unit 524, and a visual texture combination unit 525. The decoding unit 520 may further include a correction unit 526.

The decompression unit 521 receives a compressed video signal from the encoding unit 510, and then decompresses the compressed video signal. The decompression unit 521 decompresses video excitation signals and the variables of texture synthesis filters which are used to define each of a plurality of compressed texture images, and a plurality of compressed spatio-temporal location transform variables respectively corresponding to the texture images.

The texture image generation unit 522 generates a plurality of texture blocks using both the video excitation signals and the variables of the texture synthesis filters, and generates each texture image by adding the plurality of texture blocks.

The matching unit 523 matches respective texture images and spatio-temporal location transform variables corresponding to the texture images, among the plurality of texture images generated by the texture image generation unit 522, and the plurality of spatio-temporal location transform variables, with one another in a one-to-one correspondence. It is apparent that the matching unit 523 may also match respective approximate texture images with approximate spatio-temporal location transform variables corresponding to the approximate texture images.

The visual texture generation unit 524 generates visual textures using the texture images and the spatio-temporal location transform variables that have matched one another. In detail, the visual texture generation unit 524 generates each visual texture composed of a plurality of frames of a relevant texture image by applying the spatio-temporal location transform variables, which define the motions or like of the texture points over time, to the texture image. Of course, the visual texture generation unit 524 may generate visual textures using the approximate texture images and the approximate spatio-temporal location transform variables that have matched one another.

The visual texture combination unit 525 combines the visual textures generated by the visual texture generation unit 524 to correspond to the respective texture images. The visual textures are combined, so that the plurality of frames of the shot segment are entirely reconstructed.

The correction unit 526 corrects artifacts occurring at the boundaries of the combination of the combined visual textures by filtering the artifacts. That is, the visual textures combined by the visual texture combination unit 525 are reconstructed as the simple sum thereof, and thus artifacts may be caused at the boundaries between the visual textures. The correction unit 525 performs a filtering operation for eliminating such artifacts, thus generating a final corrected, reconstructed image.

As described above, in the video processing method and apparatus based on multiple texture images according to the present invention, part or all of the above-described embodiments can be selectively combined and constructed so that various modifications are possible, without the construction and scheme of the above-described embodiments being limitedly applied.

According to the present invention, there is an advantage in that various video characteristics can be represented using a plurality of texture images and the spatio-temporal location transform variables of the texture images.

Further, the present invention is capable of providing a compressed video, the size of which is remarkably reduced compared to the size of the original video because the original video can be compressed and processed only using a plurality of texture images and a plurality of spatio-temporal location transform variables corresponding thereto. Furthermore, the present invention can provide a compressed video, the size of which is remarkably reduced compared to the original video, by defining each of a plurality of texture images as the sum of texture blocks that are outputs of texture synthesis filters which receive video excitation signals, each represented by a Gaussian function, as inputs.

Furthermore, the present invention can further reduce the size of a compressed video by approximating a number of predetermined texture images using similarities between spatio-temporal location transform variables.

Furthermore, the present invention can process videos with optimal video quality at a low transfer rate. That is, the present invention can minimize the degradation of video quality at a low transfer rate such as 1/500 bit rate.

What is claimed is:
1. A video processing method based on multiple texture images, comprising:
  dividing an input video into shot segments, and selecting one from a plurality of frames of a shot segment as a seed image;
  detecting a plurality of texture points from the seed image;
  tracking the plurality of texture points from the plurality of frames of the shot segment and calculating spatio-temporal location transform variables for the respective texture points;

defining a plurality of texture images using texture points at which the spatio-temporal location transform variables correspond to one another and merging texture images having similar spatio-temporal location transform variables within a value into a single texture image; and defining the plurality of texture images including merged texture images as a sum of a plurality of texture blocks that are outputs of texture synthesis filters that respectively receive video excitation signals as inputs, wherein merging of texture images evaluates similarities of spatio-temporal location transform variables determined by obtaining correlation characteristics between texture image signals have values falling within a preset threshold value, among the plurality of texture images, and texture images having similar spatio-temporal location transform variables are grouped and merged into a single texture image, to approximate the texture images.

2. The video processing method of claim 1, wherein each of the video excitation signals is represented by a two-dimensional (2D) Gaussian function.

3. The video processing method of claim 1, further comprising compressing the video excitation signals of the plurality of texture blocks that defines each of the plurality of texture images, variables of the texture synthesis filters for the texture blocks, and spatio-temporal location transform variables respectively corresponding to the texture images.

4. The video processing method of claim 3, wherein the compressing is configured to compress the video excitation signals, the variables of the texture synthesis filters, and the spatio-temporal location transform variables in a bit stream compression manner.

5. The video processing method of claim 1, wherein the detecting the plurality of texture points is configured to detect, as the texture points, points having variations equal to or greater than a preset value in the plurality of frames.

6. The video processing method of claim 3, further comprising:
decompressing the compressed video excitation signals, the compressed variables of the texture synthesis filters, and the compressed spatio-temporal location transform variables respectively corresponding to the compressed texture images;
generating the plurality of texture blocks using both the video excitation signals and the variables of the texture synthesis filters, and generating each texture image by adding the plurality of texture blocks;
matching the texture images with the spatio-temporal location transform variables corresponding to the texture images;
generating visual textures using the texture images and the spatio-temporal location transform variables; and
combining the generated visual textures corresponding to the respective texture images.

7. The video processing method of claim 6, further comprising correcting artifacts occurring at boundaries of combination of the visual textures by filtering the artifacts.

8. A video processing apparatus based on multiple texture images, comprising:
a seed image selection unit to divide an input video into shot segments, and selecting one from a plurality of frames of a shot segment as a seed image;
a texture point detection unit to detect a plurality of texture points from the seed image;
a variable calculation unit to track the plurality of texture points from the plurality of frames of the shot segment and calculate spatio-temporal location transform variables for the respective texture points;
a texture image definition unit to define a plurality of texture images using texture points at which the spatio-temporal location transform variables correspond to one another and merge texture images having similar spatio-temporal location transform variables within a value into a single texture image;
a texture block definition unit to define the plurality of texture images including merged texture images as a sum of a plurality of texture blocks that are outputs of texture synthesis filters that respectively receive video excitation signals as inputs; and
an approximation unit to merge texture images, which have spatio-temporal location transform variables for which similarities calculated by obtaining correlation characteristics between texture image signals have values falling within a preset threshold value, among the plurality of texture images, into a single texture image, to approximate the texture images.

9. The video processing apparatus of claim 8, further comprising a compression unit for compressing the video excitation signals of the plurality of texture blocks that defines each of the plurality of texture images, variables of the texture synthesis filters for the texture blocks, and spatio-temporal location transform variables respectively corresponding to the texture images.

10. The video processing apparatus of claim 9, wherein the compression unit compresses the video excitation signals, the variables of the texture synthesis filters, and the spatio-temporal location transform variables in a bit stream compression manner.

11. The video processing apparatus of claim 8, wherein each of the video excitation signals is represented by a two-dimensional (2D) Gaussian function.

12. The video processing apparatus of claim 8, wherein the texture point detection unit detects, as the texture points, points having variations equal to or greater than a preset value in the plurality of frames.

13. The video processing apparatus of claim 9, further comprising:
a decompression unit for decompressing the compressed video excitation signals, the compressed variables of the texture synthesis filters, and the compressed spatio-temporal location transform variables respectively corresponding to the compressed texture images;
a texture image generation unit for generating the plurality of texture blocks using both the video excitation signals and the variables of the texture synthesis filters, and generating each texture image by adding the plurality of texture blocks;
a matching unit for matching the texture images with the spatio-temporal location transform variables corresponding to the texture images;
a visual texture generation unit for generating visual textures using the texture images and the spatio-temporal location transform variables; and
a visual texture combination unit for combining the generated visual textures corresponding to the respective texture images.

14. The video processing apparatus of claim 13, further comprising a correction unit for correcting artifacts occurring at boundaries of combination of the visual textures by filtering the artifacts.

* * * * *